United States Patent [19]

Borsanyi

[11] 4,116,841
[45] Sep. 26, 1978

[54] SEMIPERMEABLE MEMBRANE MASS TRANSFER APPARATUS HAVING COLLAPSED MEMBRANE ABOUT SUPPORT MEMBERS

[75] Inventor: Alexander S. Borsanyi, Corona del Mar, Calif.

[73] Assignee: American Hospital Supply Corporation, Evanston, Ill.

[21] Appl. No.: 779,576

[22] Filed: Mar. 21, 1977

[51] Int. Cl.$^2$ .................. B01D 29/04; B01D 31/00
[52] U.S. Cl. .................. 210/321 B; 210/493 M; 264/257
[58] Field of Search ............. 210/493, 493 M, 493 R, 210/321 A, 321 B, 321 R; 264/257, 286

[56] References Cited

U.S. PATENT DOCUMENTS

| 3,788,482 | 1/1974 | Markley | 210/321 B |
| 3,827,565 | 8/1974 | Matsumura | 210/321 B |

*Primary Examiner*—Charles N. Hart
*Assistant Examiner*—David R. Sadowski
*Attorney, Agent, or Firm*—Gerald D. Sharkin; Robert S. Honor; Walter F. Jewell

[57] ABSTRACT

A mass transfer apparatus is disclosed comprising a housing, preferably rectangular, a semipermeable membrane disposed within said housing, said membrane being folded to form a stack of accordion pleats over the whole internal surface of the bottom of said housing, one or more support members being disposed within every pleat on one side only of said membrane, all edges of said membrane being embedded in plastic embedding material within said housing so that the membrane thereby forms two fluid compartments with ports allowing the flow of a fluid in each compartment, the creases of said membrane pleats being collapsed upon said support members and, at their ends, being sharply folded upon themselves and deeply penetrating into the embedding material along a longitudinal side of the housing. The creases which sharply fold upon themselves have a bi-concave external shape. A method of manufacturing the apparatus is also disclosed, comprising the following steps:

(a) Making up an assemblage comprising a semipermeable membrane folded in an accordion-like manner into a number of closely spaced pleats around support members inserted on one side of said membrane;

(b) Sealing certain edges of the membrane along substantially their whole length to form a first fluid-tight compartment disposed on the same side of the membrane as the support members and provided with at least one port, the pleats formed around the support members being in communication with the outside through such port;

(c) Connecting said first compartment to a vacuum source and drawing a vacuum in said first compartment to collapse the membrane pleats about the edges of the support members along one side of the accordion stack, after first treating such membrane pleats with a suitable softening agent to increase the pliability of the membrane, where such softening treatment is deemed necessary or desirable; and (d) Applying a solidifiable fluid plastic material over the longitudinal face of the stack, on the side where the membrane pleats are both open and without exposed support members, and solidifying said plastic material to embed the membrane pleats in such collapsed condition, thus forming a second compartment with at least one port and without bypass channels.

28 Claims, 3 Drawing Figures

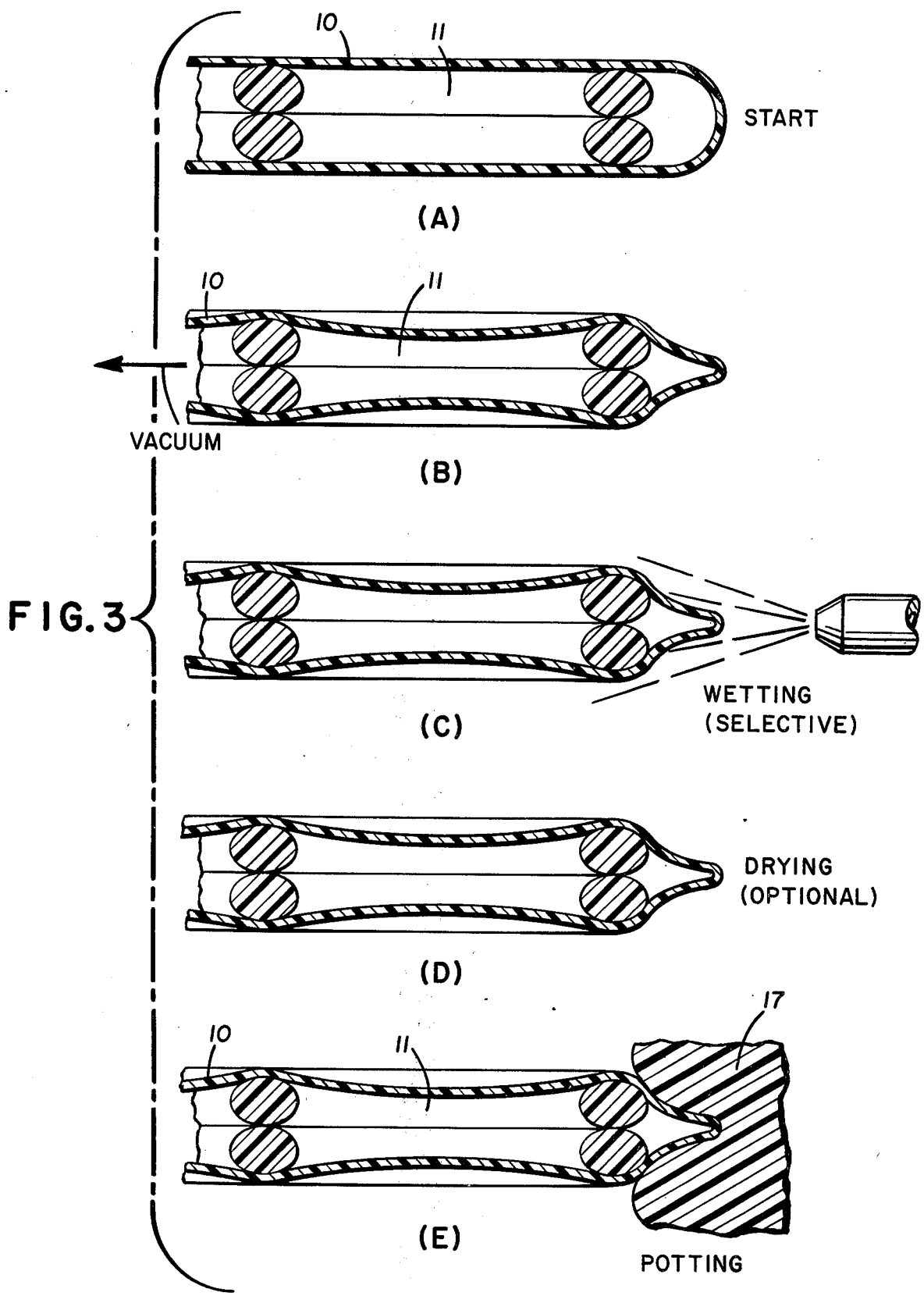

SEMIPERMEABLE MEMBRANE MASS TRANSFER APPARATUS HAVING COLLAPSED MEMBRANE ABOUT SUPPORT MEMBERS

The present invention relates to a mass transfer apparatus for the flow of fluids that are separated by a planar membrane which is folded several times upon itself in accordion-like manner.

It is described by way of example in the particular case where such an apparatus is used for the treatment of blood by hemodialysis and/or by ultrafiltration, and more particularly to an apparatus of small size and weight, economical in operation, suitable to be used at home and thrown away after use.

The invention relates to an improvement in an apparatus comprising a semipermeable membrane folded to form a stack of accordion pleats and disposed inside a fluid-tight casing provided with the necessary ports for the introduction and evacuation of blood, dialysate and/or ultrafiltrate, the pleats of the stack on one side of the membrane containing a plurality of porous or open-mesh support members.

An apparatus of this general type is already known, as disclosed particularly in U.S. Pat. No. 3,788,482. In such an apparatus blood and dialysate flow in two different compartments separated by one membrane. The edges of the accordion-folded membrane are embedded in a plastic material which solidifies to form at least a portion of the housing. Thus, the liquid which flows in one compartment between two consecutive pleats remains in a zone limited by these two pleats from one end to the other; it cannot and must not escape from this zone. FIG. 4 of the patent just cited shows especially how the rounded creases of the membrane 6 are intended to prevent any blood escaping from one pleat to another. It has now been found that such an object may not always be achieved and that changes in the physical characteristics of the membrane under conditions of use may result in slight separation of the membrane creases from the embedding or potting material. It has further been found that such separation causes the development of bypass channels which may seriously impair the efficiency, effectiveness, and general performance of such an apparatus. A part of the blood introduced into the apparatus flows through such bypasses, according to the shortest and easiest ways from the inlet port to the outlet port, instead of spreading in a thin film substantially uniformly between the pleats of the membrane. The formation of bypass channels on the blood side are now believed to account for reductions in efficiency (as measured by urea clearance) of as much as 30 percent in comparison with expected normal values.

One aspect of this invention lies in recognizing the problem and its cause; a further aspect lies in the discovery of a relatively simple but highly effective solution to that problem. Specifically an important aspect and object of the present invention consists in providing an apparatus which enables the formation of thin films of blood within the membrane pleats to cross the apparatus from one end to the other while at the same time suppressing the formation of bypass channels, thereby leading to an apparatus of greatly improved efficiency and uniformity of performance.

It is also an object of the invention to provide a simple, economical and efficient process for manufacturing such an apparatus.

In accordance with the present invention, a mass transfer apparatus is disclosed which comprises a housing, preferably rectangular, a semipermeable membrane disposed within said housing, said membrane being folded to form a stack of accordion pleats over the whole internal surface of the bottom of said housing, at least one support member being disposed within every pleat on one side only of said membrane, all edges of said membrane being embedded in an embedding medium to form two fluid compartments with ports allowing the flow of a fluid in each compartment, the creases of said membrane pleats folded around said support members being embedded or potted their full length along a longitudinal side of the housing, said creases being collapsed upon said support members and, at their ends, being sharply folded upon themselves and deeply penetrating into said potting material.

The invention relates also to a method of manufacturing such a mass transfer apparatus. This method comprises the following steps:

(a) Making up an assemblage comprising a semipermeable membrane folded in an accordion-like manner into a number of closely spaced pleats around support members inserted on one side of said membrane;

(b) Sealing certain of the edges of the membrane along substantially their whole length to form a first fluid-tight compartment disposed on the same side of the membrane as the support members with respect to the membrane and provided with at least one port, the pleats formed around the support members being in communication with the outside through such port;

(c) Connecting said first compartment to a vacuum source and drawing vacuum in said first compartment to collapse the membrane pleats about the edge of the support members along one side (the blood side) of the accordion stack, after first treating such membrane pleats with water or other suitable softening agent to increase the pliability of the membrane (where the use of such softening agent is deemed necessary or desirable); and (d) Applying a solidifiable fluid plastic material over the longitudinal face of the stack, on the side where the membrane pleats are both open and without support members therein, and solidifying said plastic material to embed the membrane pleats in such collapsed condition, thus forming a second compartment with at least one port and without bypass channels or interfacial zones that might develop bypass channels when the apparatus is put to use.

A still better understanding of the features of the present invention and its inherent advantages can be obtained from a reading of the following description of the invention and reference to the accompanying drawings in which:

FIG. 3 illustrates in a series of views A through E successive stages in the manufacture of a mass transfer apparatus in accordance with the present invention.

Figure 1:
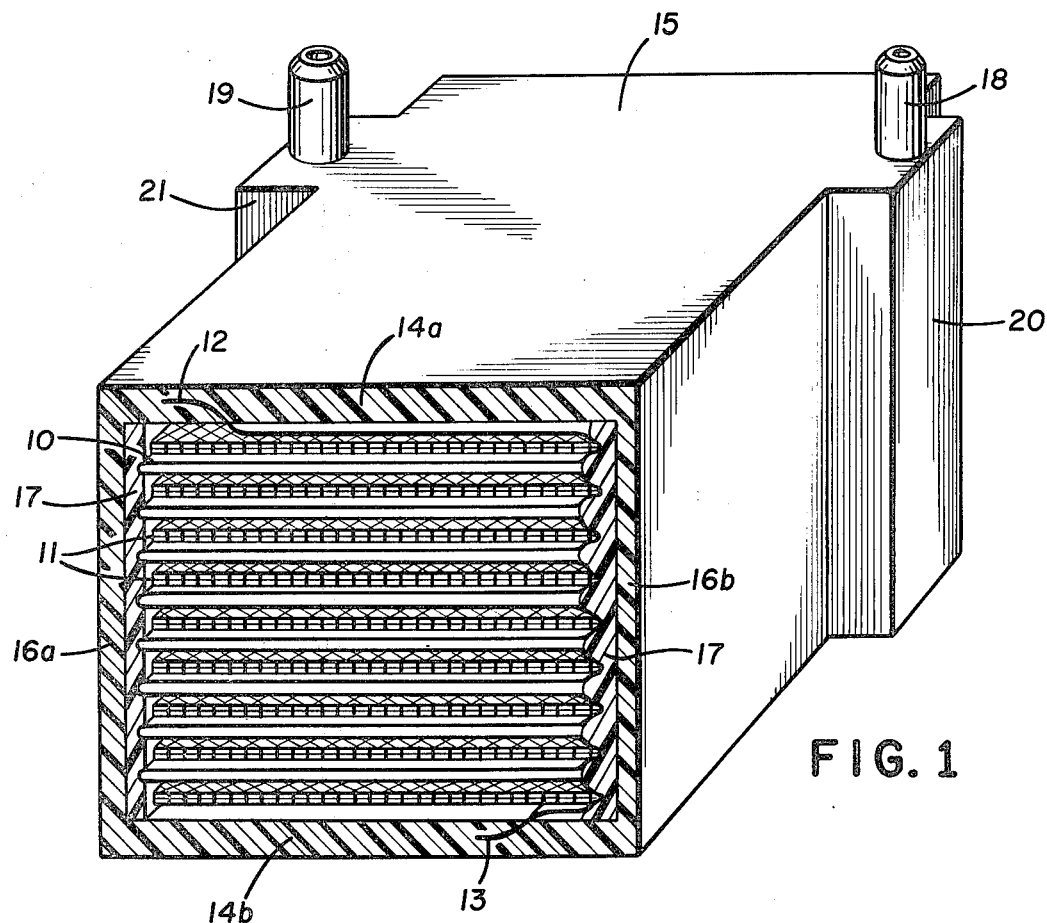
FIG. 1 is a general and somewhat schematic perspective view, taken partly in transverse section, of a known type of hemodialyzer modified to include features embodying the present invention.

The hemodialyzer, schematically shown in FIG. 1, includes a membrane 10 folded in accordion pleats about planar open-mesh support members 11, all disposed on the same side with respect to the membrane. The ends 12 and 13 of the membrane are sealed in fluid-tight relation to top 14a and bottom 14b of the casing of housing 15.

Each pleat of the membrane extends between one longitudinally disposed vertical side wall 16a and the opposing parallel side wall 16b, with the folded edges of each pleat embedded in a potting or embedding material 17 along the inner surfaces of those side walls. In addition, the ends of the support members 11 and the edges of the membrane 10 at each end of the casing are embedded in potting material long the inside surfaces of the vertical walls at both ends of the casing. Thus, the membrane divides the interior of the apparatus into two compartments, a first compartment, provided with support members for the flow of dialysate, and a second compartment, without any support members, for the flow of blood in a direction countercurrent with respect to the flow of dialysate. Suitable ports such as 18 and 19 disposed adjacent opposite ends of the casing allow the blood and dialysate to enter and leave their respective compartments. These ports 18 and 19 are connected, as is well known, to channels located within the enlarged portions 20 and 21, said channels being between said ports and every pleat of the membrane in each of the two compartments. All these arrangements so far specifically described are generally well known.

Figure 2:
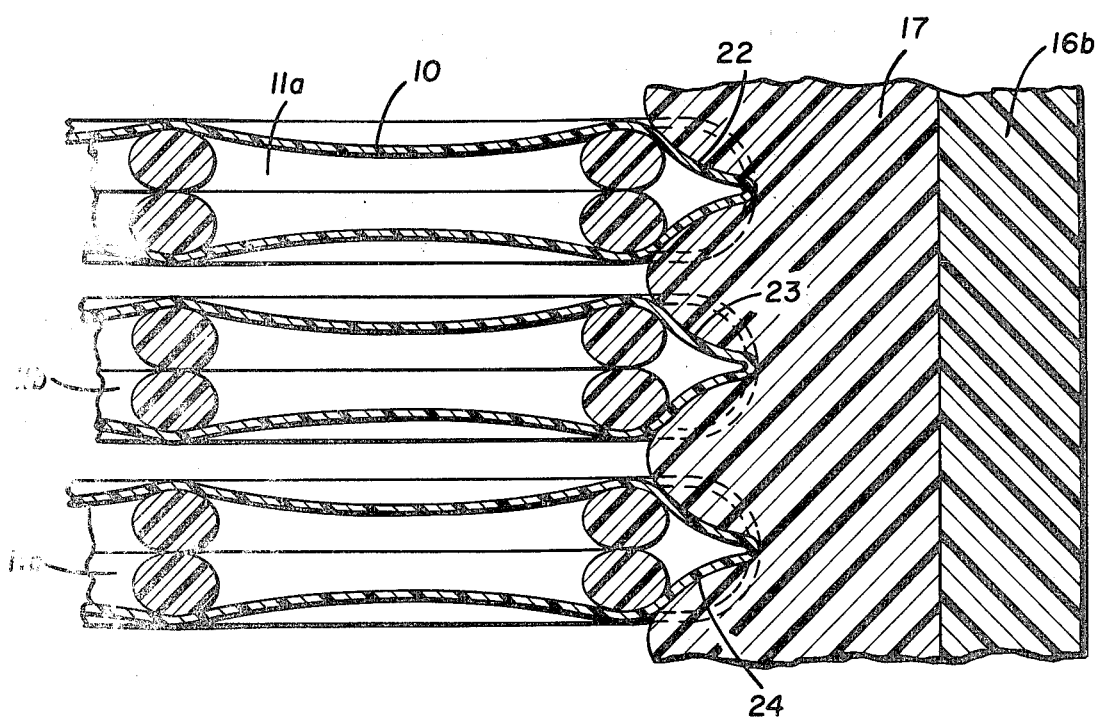
FIG. 2 is a partial view, on a larger scale, of some membrane pleats embedded in the potting material disposed along a longitudinal wall of the apparatus, on the right side as shown in FIG. 1.

FIG. 2 shows in detail how the membrane pleats such as 22, 23 and 24, around the support members such as 11A, 11B, 11C, are disposed in relation to the embedding means 17 along the internal face of the right longitudinal side wall 16b of the apparatus as shown in FIG. 1.

Dotted lines show the position of the membrane pleats in relation to the embedding means 17 and internal face of the longitudinal wall 16b of the apparatus according to the prior art. The plastic material of the embedding means 17 is fluid when brought into contact with the membrane pleats. Also it enters between the rounded membrane pleats and offers inside the apparatus, after setting or curing, a surface with alternate and parallel grooves and ribs, tightly cast around the membrane pleats.

One can readily see that, according to the prior art, the creases of the membrane pleats are regularly rounded about support members and so offer a convex external surface. It has now been found that because of swelling and other changes which inherently take place in a dialysis membrane (whether the membrane is formed of Cuprophan, polyacrilonitrile, or some other material) when that membrane is in service and a negative pressure differential is thus applied between the compartments for blood and dialysate, the membrane pleats may become detached from the potting material and cause the formation of bypass channels which are harmful to the efficiency of the apparatus.

One can also readily see that, under the same conditions, harmful bypasses do not occur at the left apparatus wall 16a because, under the difference of pressure between the two compartments for the blood and the dialysate, the membrane pleats are distended on that left side and so they remain securely in contact with the potting material.

The present invention prevents the possibility of bypass during operation since it creates a bypass condition as part of the assembly procedure and then eliminates that condition by very effectively sealing the bypass channels so that bypassing cannot thereafter occur during operation. According to the present invention, it is possible to prevent the membrane from becoming detached from the embedding medium along longitudinally extending vertical wall 16b if, during the manufacture of the apparatus, a vacuum is applied on the dialysate compartment. Preferably this vacuum is strong enough to collapse the membrane pleats around the support members as when in service, and then the solidifiable fluid plastic material 17 is applied to the membrane pleats and then solidified in this position to embed the creased edges of the collapsed pleats. The membrane cannot thereafter move in relation to the potting material along wall 16b, and accordingly bypasses cannot occur during operation of the device.

The collapsed membrane takes the shape and assumes the position shown in full lines in FIG. 2. The area between the dotted and the full lines for the membrane is shown as cross-hatched. This cross-hatched area is filled with the plastic material placed around the creases of the membrane after collapsing under the applied vacuum. It corresponds almost exactly to the void spaces which if present would have allowed bypasses for the blood and thus destroyed the efficient operation of the apparatus.

FIG. 3 shows in a series of views the several successive stages of manufacture. A shows the configuration at the start; B the configuration upon application of the vacuum; C the wetting with e.g., water in the case of Cuprophan which is a conventional regenerated cellulose membrane material; D the configuration after drying in the case of Cuprophan; and E the final configuration after potting.

It will be observed from FIG. 2 that the creases of the pleats of the membrane, collapsed around the support members, extend beyond the right longitudinal ends of support members, and that the creases are sharply folded upon themselves, with a substantially bi-concave external shape in cross section. These sharp creases plunge or extend deeply into the plastic material 17 which forms a part of the wall 16b of the apparatus, and indeed have a configuration resembling that of a cusp.

The shape of these creases depends on the type, the shape, and the location of the edge of the support members. They may be regular, continuous and parallel to the plane of the support members, but they also may be somewhat irregular, discontinuous or inclined in regard to the plane of the support members.

As support members, it is possible to use supports of any known types, but preferably they are made of nonwoven mesh of a plastic material such as a polyolefin. One suitable commercially-available open-mesh material is sold under the name Vexar. With regard to the embedding medium, any conventional soildifiable plastic such as epoxy or polyurethane may be used. The housing 15 would ordinarily be formed of a plastic material such as polycarbonate, polystyrene, or polymethylmethacrylate, although other materials might be employed.

A method of manufacturing the apparatus according to the present invention comprises the main following steps:

As assemblage is made, comprising a semipermeable membrane folded in an accordion-like manner into a number of closely spaced pleats around support members inserted on one side of the membrane.

An envelope is made for this assemblage. One embodiment employs a preconstructed casing with a first one of the two longitudinally extending vertical walls of the casing in close proximity to the pleats in the assemblage, each of the two walls being provided at each end with access ports to the interior of the housing. A plastic material within the preconstructed casing constitutes a portion of the housing and surrounds the edges of the membrane sealingly embedding those edges on their whole length thereby forming a separate fluid compartment on each side of the membrane.

Alternatively, no preconstructed casing is used, but instead a housing is formed in place about the membrane assemblage. The housing is formed by surrounding the membrane assemblage with a plastic material which constitutes at first a part of the entire housing and which also surrounds the edges of the membrane and sealingly embeds those edges on their whole length so as to form separate fluid compartments on each side of the membrane which undulates back and forth across the width of the housing. Access ports are sealingly mounted on the housing over openings communicating with the interior of the housing.

In each embodiment, the access ports provide means for passing one fluid through one of the separate fluid compartments in a direction generally parallel to the creases of the pleats and a second fluid through the other fluid compartment on the opposite side of the membrane, countercurrent to the first fluid.

When the edges of the membrane at the top, bottom, and ends of the stack have been sealed by potting or otherwise to produce an assemblage in which the accordion-folded membrane separates the first and second compartments (i.e., what is to become the dialysate and blood compartments, respectively), with the support members disposed only within the pleats of that first compartment, this first compartment is connected to a vacuum source, and vacuum is applied on this first compartment. Generally, a suitable vacuum is between 50 and 200 mm Hg, according to the thickness and/or the stiffness of the membrane.

When the membrane is rather thick and/or stiff, it is preferred to treat at least those portions of it along the creases on the blood side with water or other suitable softening agent before applying the vacuum. Advantageously only the creases of the pleats are wetted to make them more pliable. Water is particularly effective as a liquid softening agent for Cuprophan membranes. The membrane is then collapsed about the support members and on itself near the edges of the support members as shown in FIG. 2.

The solidifiable fluid plastic material 17 is then applied over the longitudinal side face of the membrane stack, on the side where the membrane pleats are without any support members. This plastic material is then allowed to solidify, thus making the second compartment leak-tight and bypass-free. Throughout this potting step the vacuum on what is to become the blood side of the dialyzer (i.e., the second compartment) is usually maintained until the plastic has solidified and the membrane has dried. Where such embedding or potting of the membrane along the creases of the blood side occurs while the membrane is wet and in its softened or pliable state, it is believed essential to maintain the vacuum until the plastic has solidified; however, where such creases are treated with a liquid softening agent such as water and are then allowed to dry prior to the embedding step, the vacuum may sometimes by relieved prior to complete solidification of the embedding medium.

EXAMPLE

Two similar hemodialyzers were built: the first, according to the prior art and the second, of otherwise the same general construction and arrangement but made according to the present invention. The blood side folds of the membrane were wetted with water and a 100 mm Hg vacuum was applied to the dialysate compartment, before potting the blood compartment. The wetted membrane, which was a regenerated cellulose membrane having a thickness of about 11.5 microns, collapsed into the shape it would take as shown in FIG. 2 when operating the hemodialyzer at 100 mm Hg transmembrane pressure. Vacuum was maintained on the stack for 15 minutes, until the membrane dried and "froze" in its collapsed state. Then routine side potting with epoxy resin and assembly followed. It was found that the urea clearance was 109 ml/min with the first hemodialyzer versus 140 ml/min with the second one under the same operating conditions.

The apparatus has been described in a form particularly adapted for use as a hemodialyzer provided with four ports, two for blood and two for dialysate, and hence for the treatment of blood by hemodialysis and/or by ultrafiltration. However, the apparatus according to the present invention may comprise only three ports, two for blood and one only for the exit of ultrafiltrate. In each of these cases the features described herein improved the blood circulation and the efficiency of the apparatus.

This apparatus may also be adapted for other treatment of blood, for instance as a blood oxygenator in an artificial lung.

Moreover, the terms "blood" and "dialysate" are employed herein to identify exemplary fluids, and are used merely for convenience of exposition and as such are to be construed as including other fluids.

Also other types of membranes or folded sheets may be employed as desired and as indicated by the particular fluids and by the nature of the desired transfer between the fluids.

What is claimed is:

1. A mass transfer apparatus comprising a housing formed at least in part of solidified plastic material, a semipermeable membrane disposed within said housing, said membrane being folded to form a stack of accordion pleats, support members being disposed within the pleats on one side of the membrane, the ends, top and bottom and the sides of the stack being sealed to the housing except at longitudinally spaced side regions defining inlet and outlet regions on both sides of the stack, whereby two fluid compartments divided by said membrane are formed in the stack with each fluid compartment having longitudinally spaced inlet and outlet regions, the housing being provided with longitudinally spaced inlet and outlet ports individually communicating with said inlet and outlet regions enabling a fluid to be passed through each fluid compartment, those pleats of said membrane which receive said support members extending about longitudinal edges of said support members to define longitudinal creases, said creases being collapsed upon themselves and upon said longitudinal edges of said support members and being embedded in such collapsed condition in said solidified plastic material of said housing, thereby eliminating bypass channels in the compartment devoid of said support members.

2. A mass transfer apparatus according to claim 1, wherein said housing is formed in part of solidified plastic material and also includes an outer part which extends about said stack and about the solidified plastic material embedding the creases of the membrane.

3. A mass transfer apparatus according to claim 1, wherein said creases which sharply fold upon themselves have a bi-concave external shape.

4. A mass transfer apparatus according to claim 1, wherein said apparatus is adapted for use in hemodialysis and/or ultrafiltration.

5. A method of manufacturing the apparatus as defined in claim 1 comprising the following steps:
(a) making an assembly by folding a semipermeable membrane into a number of closely spaced pleats around perforated support members on one side of said membrane;
(b) making from the membrane a first fluid-tight compartment by providing a seal over all pleat folds on said one side of said membrane and the edges of the membrane, and providing said compartment with at least one port;
(c) connecting said first compartment to a vacuum source and applying vacuum to said first compartment forming creases in those portions of the pleats folded about edges of said support members; and
(d) applying a solidifiable fluid material over the said creases while said vacuum is applied, and solidifying said fluid material, thus forming a second compartment in which said creases are embedded, and also providing shape-sustaining support by the solidized fluid material for the creases, and providing said second compartment with at least one port.

6. A method according to claim 5, comprising treating at least a part of the membrane to soften the same before applying vacuum.

7. A method according to claim 6, in which said treating step comprises wetting the membrane with water.

8. A method according to claim 6, in which only the creases of the membrane pleats are softened in said treating step.

9. A method according to claim 7, in which vacuum is maintained until the membrane is dried.

10. A method according to claim 5, in which said vacuum is maintained until said plastic material has solidified.

11. A method according to claim 5, wherein the membrane is Cuprophan.

12. A method according to claim 5, wherein the membrane is polyacrylonitrile.

13. A method according to claim 5, wherein the member polyolefin. polycarbonate.

14. A mass transfer apparatus comprising a semipermeable membrane folded to form a stack of accordion pleats, support members disposed within the pleats of said folded membrane, and means embedding the edges of said pleats, wherein the improvement comprises:
at least some of the pleats of said membrane having folded edge portions which project beyond the side edges of the support members received therein;
each said projecting folded edge portion of said membrane collapsed upon itself and against the edge of the support member received therein and being embedded in said collapsed condition by said embedding means.

15. The apparatus of claim 14, wherein the projecting folded edge portions have a bi-concave external shape.

16. A mass transfer apparatus according to claim 14, wherein said support members are of non-woven plastic mesh construction.

17. A mass transfer apparatus according to claim 14, wherein the membrane is adapted for hemodialysis and/or ultrafiltration.

18. A method of manufacturing a mass transfer apparatus comprising the following steps:
(a) making an assembly by folding a semipermeable membrane into a number of closely spaced accordion pleats around support members disposed adjacent one side of said membrane, at least some of the pleats having folded edge portions projecting beyond the edges of said support members received therein;
(b) drawing a vacuum within the folds of said pleats which open to said one side of said membrane to collapse said projecting folded edge portions;
(c) embedding said projecting folded edge portions while they are so collapsed in a solidifiable fluid material; and
(d) allowing said material to solidify while said folded edge portions are so collapsed.

19. The method of claim 18, wherein the extent of said vacuum is substantially the same as the negative pressure of the apparatus in operating condition.

20. A method according to claim 18, comprising treating at least said folded edge portions of the membrane to soften the same before applying vacuum.

21. A method according to claim 20, in which said treating step comprises wetting at least said folded edge portions of the membrane with water.

22. A method according to claim 20, in which said vacuum is maintained until said plastic material has solidified.

23. A method of manufacturing the apparatus as defined in claim 1 comprising the following steps:
(a) making up an assemblage comprising a semipermeable membrane folded in an accordion-like manner into a number of closely spaced pleats around support members inserted on one side only of said membrane;
(b) enclosing said assemblage and sealing edges of the membrane along their whole length to define a first fluid-tight compartment disposed on the same side as the support members with respect to the membrane and provided with at least one port, the pleats formed around the support members in said first compartment communicating through said port with the outside;
(c) connecting said first compartment to a vacuum source and applying the vacuum to said first compartment; and
(d) applying a solidifiable fluid plastic material to said assemblage on the side thereof where the membrane pleats are both open and devoid of support members while said vacuum is so applied, and solidifying said plastic material, thus forming a second compartment free of bypass channels between said solidified plastic and said membrane.

24. A method according to claim 23, comprising the additional step of treating at least a part of the membrane to soften the same before applying vacuum.

25. A method according to claim 24, in which said treating step comprises wetting the membrane with water.

26. A method according to claim 24, in which only the creases of the membrane pleats are softened in said treating step.

27. A method according to claim 25, in which vacuum is maintained until the membrane is dried.

28. A method according to claim 24, in which vacuum is maintained until said plastic material has solidified.

* * * * *